H. A. SCHNELBACH & E. J. SCHATZ.
GLASS BLOWING MACHINE.
APPLICATION FILED APR. 27, 1908.

922,342.

Patented May 18, 1909.

2 SHEETS—SHEET 2.

WITNESSES.

INVENTORS

UNITED STATES PATENT OFFICE.

HARRY A. SCHNELBACH, OF CRAFTON, PENNSYLVANIA, AND EDWARD J. SCHATZ, OF MARION, INDIANA, ASSIGNORS TO MACBETH-EVANS GLASS COMPANY, OF PITTSBURG, PENNSYLVANIA, A CORPORATION OF PENNSYLVANIA.

GLASS-BLOWING MACHINE.

No. 922,342.     Specification of Letters Patent.     Patented May 18, 1909.

Application filed April 27, 1908. Serial No. 429,417.

*To all whom it may concern:*

Be it known that we, HARRY A. SCHNELBACH, a resident of Crafton, in the county of Allegheny and State of Pennsylvania, and EDWARD J. SCHATZ, a resident of Marion, in the county of Grant and State of Indiana, have invented a new and useful Improvement in Glass Blowing Machines; and we do hereby declare the following to be a full, clear, and exact description thereof.

Our invention relates to glass blowing machines, its object being to provide a simple and efficient means for oscillating the blow pipes as they travel around on a rotary frame.

It is very desirable in the manufacture of certain lines of ware to be able to oscillate the blow pipe so as to prevent the twisting or distorting of the glass in the mold, which sometimes occurs where the blow pipe is rotated continuously in one direction.

To these ends our invention comprises the novel features hereinafter set forth and claimed.

Figure 1:
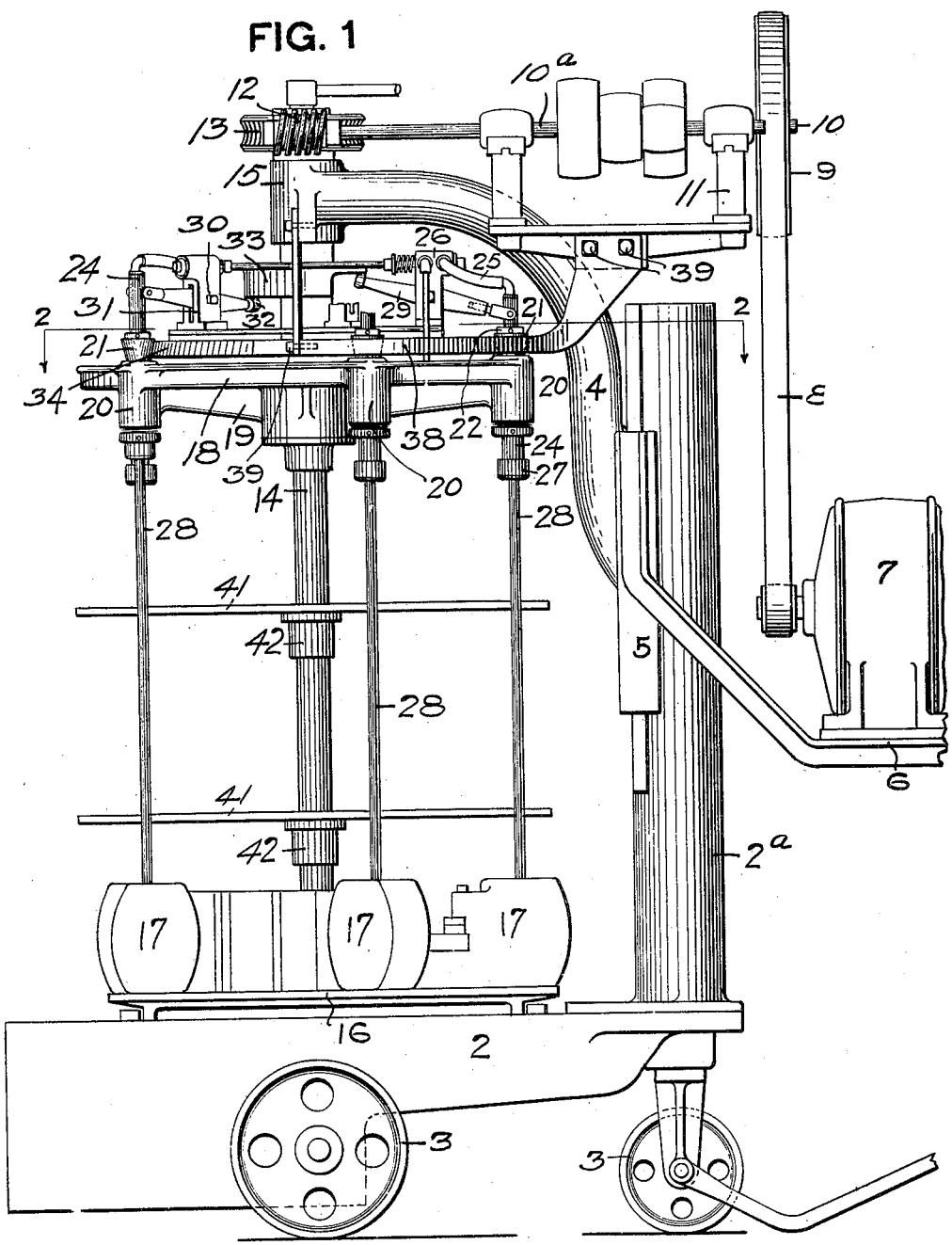
Figure 2:
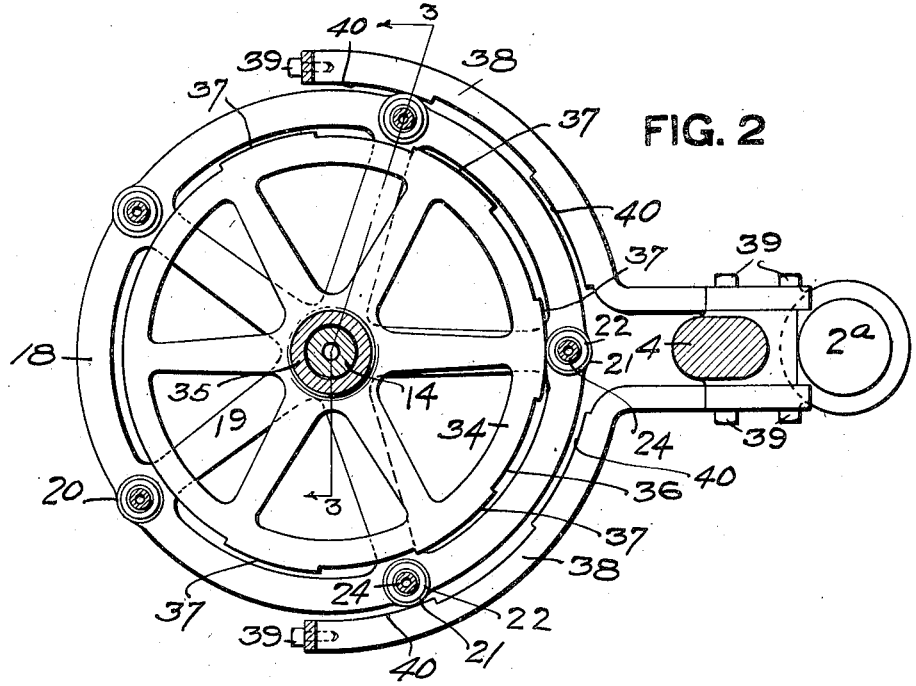
Figure 3:
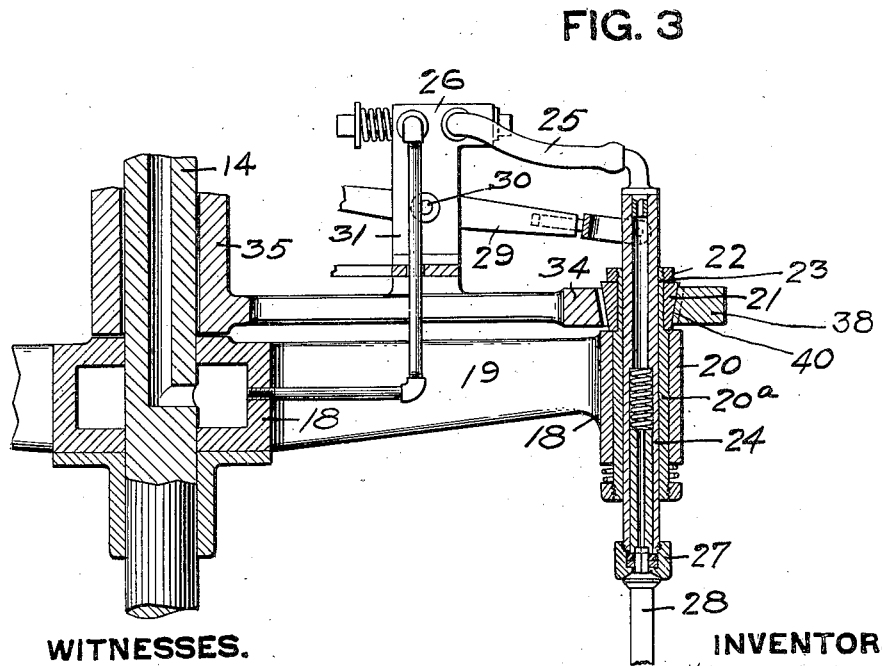

In the accompanying drawings Figure 1 is a side elevation of a glass blowing machine embodying our invention; Fig. 2 is a cross section on the line 2—2 Fig. 1; Fig. 3 is an enlarged detail.

We have shown our invention as applied to an ordinary form of glass blowing machine, and as the construction of the machine in itself forms no part of our invention we will only refer to the same generally.

The numeral 2 designates the base or support of the machine which may be mounted on wheels 3 for transporting the machine from one point in the factory to another. Supported on the base 2 is the pillar 2ª to which the frame 4 is secured, said frame being vertically adjustable in suitable guides 5 on the pillar 2ª. On the frame 4 is the shelf 6 which forms the support for a suitable electric motor 7. A belt 8 connects the motor shaft with the pulley 9 on the shaft 10 journaled in suitable bearings 11 on the frame 4. Shaft 10 is connected by a belt to a counter shaft 10ª. Secured to the counter shaft 10ª is the worm 12 which engages the worm wheel 13 on the vertical shaft 14. This shaft 14 is stepped at its lower end in the base 2, and said shaft at its upper end passes through the sleeve 15 on the frame 4.

The table 16 is secured to the shaft 14, said table carrying the molds 17 which are arranged at proper intervals around the outer edge of said table 16.

Keyed to the shaft 14 is the ring 18 strengthened by the radial arms 19. At suitable intervals in the ring 18 are the sleeves 20 which are provided with the rotary bushings 20ª, said bushings being provided at their upper ends with the friction beveled collars 21 which may be formed of some fibrous material to provide the necessary friction. These collars 21 are held in place by means of the binding nuts 22 which engage the threaded necks 23 on the bushings 20. Extending down through the bushings 20 are the pipes 24 which convey the air to the blow pipes, said pipes 24 being connected by flexible connections 25 to the air chambers 26 to which air is supplied in proper quantity. The sockets 27 on the lower ends of the pipes 24 are adapted to engage the upper ends of the blow pipes 28. The pipe 24 is vertically movable in the bushing 20, and to provide for this vertical movement of the pipe 24 in bringing the sockets 27 into engagement with the blow pipes and releasing them therefrom, the levers 29 are provided, said levers being fulcrumed at 30 to the standards 31. The outer ends of the levers 29 are pivoted to the upper ends of the pipes 24. The outer ends of the levers 29 have the friction wheels 32 thereon which are adapted to travel along the cam 33.

A fixed ring 34 is provided with the sleeve 35 which passes up within and is connected to the sleeve 15 on the frame 4. The periphery of this fixed ring 34 is provided with the recesses 36 which form the projecting beveled faces 37.

Arc-shaped arms 38 are secured by bolts 39 to the frame 4, said arc-shaped arms having the frictional contact beveled faces 40, said faces being arranged opposite the recessed portions 36 of the ring 34.

Carried by the shaft 14 are the racks 41 which are supported by the collars 42 on said shaft, said racks at their outer ends being adapted to receive the blow-pipes 28.

When our improved machine is in use the blow pipes with the molten glass on the end thereof are inserted in the racks in such position as to bring the lower ends of said blow pipes into proper position with reference to the open mold, whereupon the mold is closed and the socket 27 is lowered automatically by means of the levers 29 working in connection with the cam 33. The blow pipes are arranged to be inserted at the front of the machine and while the machine is in operation and the table carrying the molds as well as the ring 18 are in course of rotation. The mold after being closed moves around until the blow pipe comes into the space between the ring 34 and the arc-shaped arms 38, and the frictional faces 40 and 37 will alternately engage the friction collar 21 of the bushing 20 and so impart an oscillatory movement to said bushing which in turn communicates a like oscillatory movement to the blow pipe 28. By having these frictional faces arranged in the manner shown it is apparent that while one of the frictional faces 40 is in engagement with the friction collar 21 the blow pipe will be rotated in one direction and when said friction collar comes in contact with one of the frictional faces 37 the blow pipe will be rotated in an opposite direction. The time of rotation of the blow pipe in one direction may be readily regulated by the length of the frictional faces and in this way the oscillatory movement may be increased or diminished. This oscillatory movement will be imparted to the blow pipes as long as they move within the space between the ring 34 and the arc-shaped arms 38 and when they pass therefrom the mold will be opened and the blow pipe removed and another inserted to take its place. These operations of the machine, however, are well known to those skilled in the art and it is not deemed necessary to refer to the same in further detail.

What we claim is:

1. In a glass blowing machine, the combination of a rotary frame, molds and blow pipes carried thereby, means for rotating said frame, rotary connecting members on said frame, means for supplying air thereto, means for connecting said blow pipes to said connecting members, and means for imparting an oscillatory movement to said connecting members in the course of their travel and through said connecting members to said blow pipes.

2. In a glass blowing machine, the combination of a rotary frame, molds and blow pipes carried thereby, means for rotating said frame, rotary connecting members on said frame, means for supplying air thereto, means for connecting said blow pipes to said connecting members, and frictional means for imparting an oscillatory movement to said connecting members in the course of their travel.

3. In a glass blowing machine, the combination of a rotary frame, molds and blow pipes carried thereby, means for rotating said frame, rotary connecting members carried on said frame, means for supplying air thereto, means for connecting up said blow pipes to said connecting members, and curved friction members having friction faces adapted to alternately engage said rotary connecting members.

4. In a glass blowing machine, the combination of a rotary frame, molds and blow pipes carried thereby, means for rotating said frame, rotary connecting members, means for connecting up said blow pipes to said connecting members, curved friction members the one within the other having friction faces at intervals, the faces of one member being non-coincident with those of the other member, and means for bringing said connecting members into frictional contact with said friction faces of said friction members.

5. In a glass-blowing machine, the combination of a rotary frame, molds and blow-pipes carried thereby, means for rotating said frame, rotary connecting members, means for connecting up said blow pipes to said connecting members, a ring having friction faces at intervals therein, curved arms having friction faces at intervals thereon, the faces of said ring being non-coincident with those of said arms, and means for bringing said connecting members into frictional contact with said friction faces of said friction members.

6. In a glass-blowing machine, the combination of a rotary frame, molds and blow-pipes carried thereby, means for rotating said frame, rotary connecting members, means for connecting up said blow pipes to said connecting members, beveled friction wheels on said connecting members, curved friction members having beveled friction faces at intervals, the faces of one member being non-coincident with those of the other member, and means for bringing said connecting members into friction contact with said friction faces of said friction members.

In testimony whereof, we the said HARRY A. SCHNELBACH and EDWARD J. SCHATZ have hereunto set our hands.

HARRY A. SCHNELBACH.
EDWARD J. SCHATZ.

Witnesses:
C. J. BAUMANN,
J. H. DEAKIN.